(12) United States Patent
Baghdadi

(10) Patent No.: US 9,926,423 B2
(45) Date of Patent: *Mar. 27, 2018

(54) LOW DENSITY FOAM, MIDSOLE, FOOTWEAR, AND METHODS FOR MAKING LOW DENSITY FOAM

(71) Applicant: NIKE, Inc., Beaverton, OR (US)

(72) Inventor: Hossein A. Baghdadi, Portland, OR (US)

(73) Assignee: Nike, Inc., Beaverton, OR (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/958,517

(22) Filed: Aug. 2, 2013

(65) Prior Publication Data

US 2015/0038605 A1 Feb. 5, 2015

(51) Int. Cl.
| | |
|---|---|
| *C08J 9/12* | (2006.01) |
| *C08J 9/00* | (2006.01) |
| *C08J 9/14* | (2006.01) |
| *B29C 44/34* | (2006.01) |
| *B29C 44/58* | (2006.01) |
| *C08J 9/06* | (2006.01) |
| *B29L 31/50* | (2006.01) |
| *B29K 21/00* | (2006.01) |
| *B29K 23/00* | (2006.01) |
| *B29K 75/00* | (2006.01) |

(52) U.S. Cl.
CPC ............. *C08J 9/12* (2013.01); *B29C 44/3446* (2013.01); *B29C 44/588* (2013.01); *C08J 9/0061* (2013.01); *C08J 9/06* (2013.01); *C08J 9/122* (2013.01); *C08J 9/141* (2013.01); *B29K 2021/003* (2013.01); *B29K 2023/083* (2013.01); *B29K 2075/00* (2013.01); *B29L 2031/50* (2013.01); *C08J 2201/00* (2013.01); *C08J 2201/024* (2013.01); *C08J 2201/026* (2013.01); *C08J 2201/03* (2013.01); *C08J 2203/06* (2013.01); *C08J 2203/08* (2013.01); *C08J 2203/14* (2013.01); *C08J 2203/182* (2013.01); *C08J 2203/184* (2013.01); *C08J 2205/06* (2013.01); *C08J 2300/22* (2013.01); *C08J 2300/26* (2013.01); *C08J 2323/08* (2013.01); *C08J 2331/04* (2013.01); *C08J 2375/04* (2013.01); *C08J 2375/08* (2013.01); *C08J 2475/06* (2013.01)

(58) Field of Classification Search
CPC ....... B29C 45/001; C08J 9/35; C08J 2300/26; C08J 2203/08
See application file for complete search history.

(56) References Cited

U.S. PATENT DOCUMENTS

| | | | |
|---|---|---|---|
| 4,989,870 A * | 2/1991 | Janes ................... | A63B 49/022 273/DIG. 8 |
| 5,879,725 A | 3/1999 | Potter | |
| 2004/0041292 A1 | 3/2004 | Chen et al. | |
| 2004/0080070 A1 | 4/2004 | Liu et al. | |
| 2008/0005856 A1 | 1/2008 | Hung et al. | |
| 2008/0132591 A1 * | 6/2008 | Lawrence ........... | B29B 17/0042 521/49 |
| 2010/0083541 A1 * | 4/2010 | Baucom et al. .............. 36/25 R | |
| 2011/0232135 A1 | 9/2011 | Dean et al. | |
| 2014/0151918 A1 | 6/2014 | Hartmann | |

FOREIGN PATENT DOCUMENTS

| | | |
|---|---|---|
| EP | 1266928 A1 | 12/2002 |
| EP | 1273418 A2 | 1/2003 |
| GB | 1154965 A | 6/1969 |
| JP | 10151647 | 6/1998 |
| JP | 2001293741 A | 10/2001 |
| KR | 1019840000425 B1 | 4/1984 |
| KR | 20050010953 A | 1/2005 |
| KR | 100539131 A4 | 12/2005 |
| KR | 20110139289 A | 12/2011 |
| WO | 20120659526 A1 | 5/2012 |

OTHER PUBLICATIONS

Fydor A. Shutov, Integral/Structural Polymer Foams: Technology, Properties and Applications, Dec. 1986, Springer-Verlag Berlin Heidelberg GmbH, p. 59-70.*

Written Opinion and International Search Report for PCT/US2014/045880 dated Oct. 22, 2014.

Office Action issued by the Chinese Patent Office for application 201480043254, dated Oct. 21, 2016.

Office Action issued by the Chinese Patent Office for application 201480043254, dated Apr. 25, 2017.

Office Action issued by the Korean Patent Office for application 10-2016-7005496, dated Mar. 8, 2017 with English Translation.

* cited by examiner

*Primary Examiner* — Melissa A Rioja

(74) *Attorney, Agent, or Firm* — Thomas | Horstemeyer LLC

(57) ABSTRACT

Foamed thermoplastic elastomeric polyurethane and ethylene-vinyl acetate copolymer articles are made with a combination of a supercritical fluid and a non-supercritical fluid blowing agent.

24 Claims, 4 Drawing Sheets

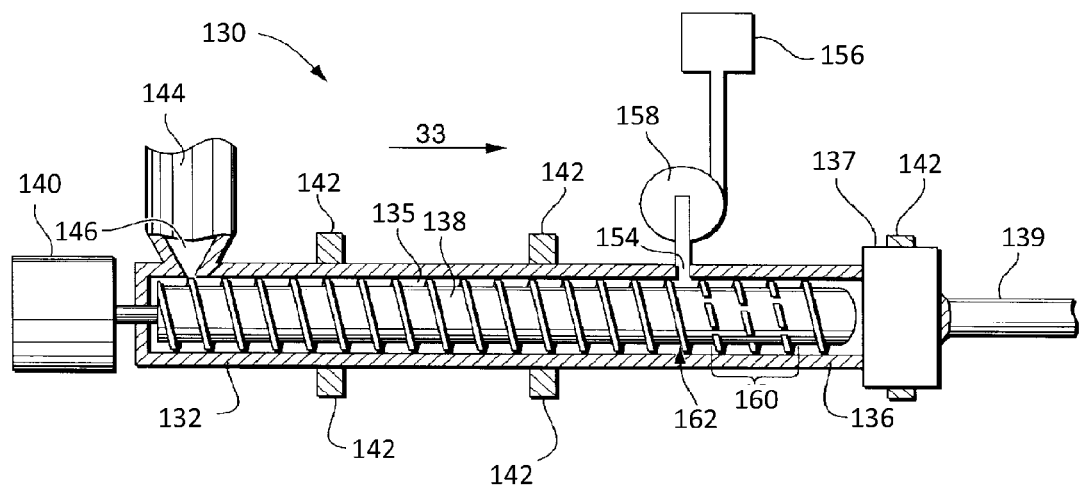
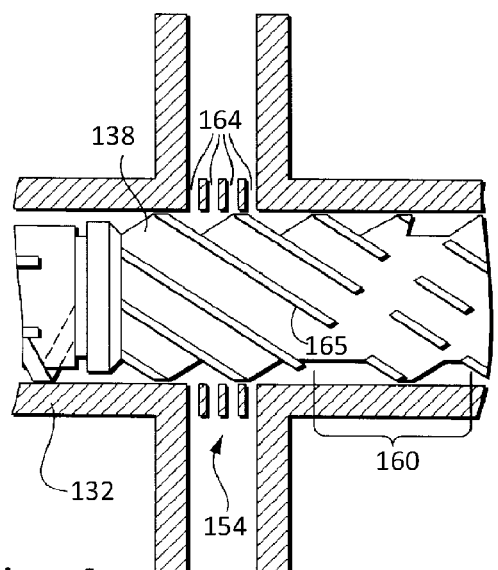
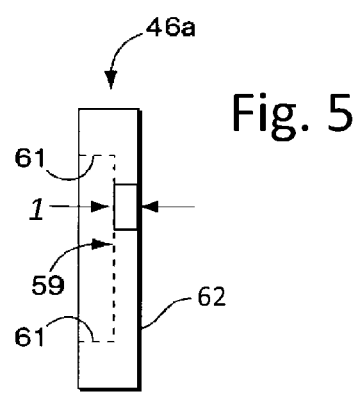
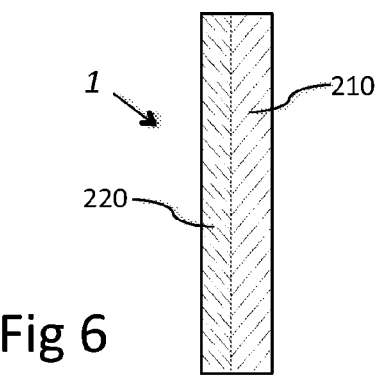

LOW DENSITY FOAM, MIDSOLE, FOOTWEAR, AND METHODS FOR MAKING LOW DENSITY FOAM

FIELD OF THE INVENTION

The present invention relates to foamed articles of thermoplastic elastomers and methods for making them.

Introduction to the Disclosure

This section provides information helpful in understanding the invention but that is not necessarily prior art.

Thermoplastics are desirable as recyclable materials. However, thermoset materials can have properties better suited for some applications.

Brant et al., U.S. Pat. No. 6,759,443 describes polyurethane foam shoe soles made by foaming a polyurethane made from vinyl polymer-grafted polyoxyalkylene polyether. Polyethylene wax and polytetrafluoroethylene are added to improve abrasion resistance.

Takemura et al., U.S. Pat. No. 6,878,753 describes shoe soles and midsoles made of a thermoset polyurethane foam. The foam is made by a process comprising mixing a polyol solution, which is previously prepared by mixing a polyol, with a catalyst, water and urea, a chain extender, and an additive as occasion demands, with a polyisocyanate compound with stirring in a molding machine; and injecting the resulting mixture into a mold and foaming the mixture. The density of a molded article of the polyurethane foam is said to be 0.15 to 0.45 $g/cm^3$.

It can be important for cushioning materials to have as properties resiliency and high energy return, but thermoplastic elastomers providing such properties have generally produced foams of higher density than is desirable in certain applications.

SUMMARY OF THE DISCLOSURE

This section provides a general summary rather than a comprehensive disclosure of the full scope of the invention and of all its features.

Disclosed is a method for making a low density foamed article by foaming a thermoplastic polyurethane elastomer or a thermoplastic elastomer ethylene-vinyl acetate copolymer using a supercritical fluid. The thermoplastic elastomer is combined with up to 15% by weight, based on polymer weight, of a physical or chemical blowing agent other than a supercritical fluid, and this mixture is combined in an extruder with a supercritical fluid. The mixture of the polymer, blowing agent, and supercritical fluid is either extruded through a die to form a foam that is cut or molded or both into a desired shape for the foamed article, or the mixture is injection molded to form the foamed article. In an embodiment for injection molding, the mold contains a porous tool for absorbing gas generated during foaming of the molded article.

The foamed thermoplastic polyurethane elastomer or ethylene vinyl acetate articles may have densities of as low as about 0.15 $g/cm^3$. The method may be used to make very low density cushioning components for straps, protective gear, footwear components (such as a midsole or part of a midsole, an outsole, cushioning for a tongue or a sockliner), and for other applications.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Various embodiments are described with reference to the drawings, in which:

FIG. 3 illustrates an extrusion system used in an embodiment of the process;

FIG. 4 illustrates a multi-hole blowing agent feed orifice arrangement and extrusion screw that may be used in embodiments of the process;

FIG. 5 illustrates the work surface area and the platen of a mold that may be used in the disclosed injection molding process; and FIG. 6 illustrates an embodiment of a mold that may be used in the disclosed injection molding process.

DETAILED DESCRIPTION

Figure 1A:
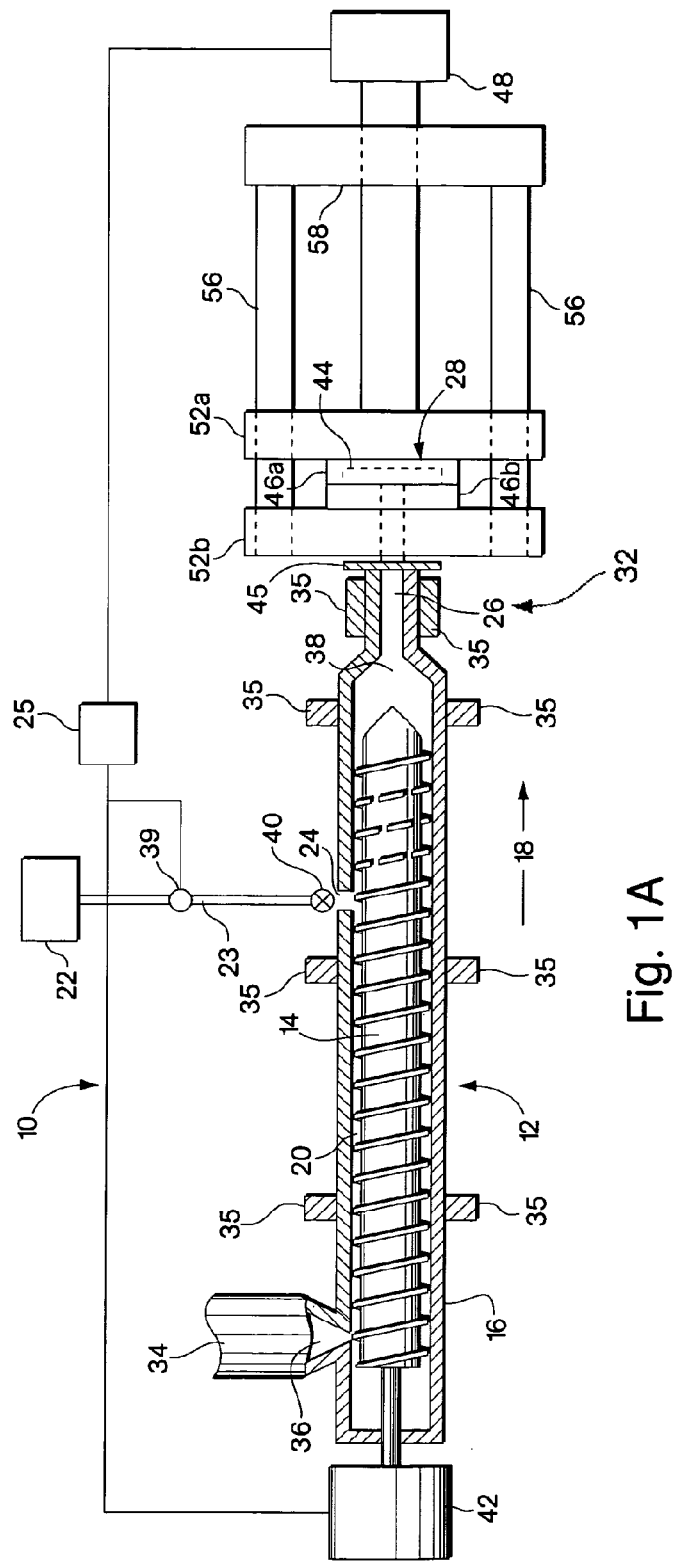
FIGS. 1A and 1B show an injection molding system used in an embodiment of the disclosed process at different stages during the molding cycle.

A detailed description of exemplary, nonlimiting embodiments follows.

The low density foamed article is made by foaming a thermoplastic polyurethane elastomer or a thermoplastic ethylene-vinyl acetate copolymer using both a supercritical fluid and up to about 15% by weight, based on polymer weight, of a physical or chemical blowing agent other than a supercritical fluid.

Thermoplastic TPU and EVA Elastomers

The thermoplastic polyurethane elastomer may have a melt index (also called a melt flow index or melt flow rate) of from about 5 to about 100 grams/10 min. (at 190° C., 8.7 kg) or from about 180 to about 300 grams/10 min. (at 200° C., 21.6 kg) as measured using the procedure of ASTM D1238. The thermoplastic ethylene-vinyl alcohol copolymer may have a melt index of from about 0.5 to about 50 grams/10 min. (at 190° C., 2.16 kg) as measured using the procedure of ASTM D1238. In various embodiments, the melt index for the polyurethane is preferably from about 5 to about 50 grams/10 min. (at 190° C., 8.7 kg), more preferably from about 15 to about 30 grams/10 min. (at 190° C., 8.7 kg) or preferably from about 180 to about 250 grams/10 min. (at 200° C., 21.6 kg), more preferably from about 180 to about 220 grams/10 min. (at 200° C., 21.6 kg) as measured using the procedure of ASTM D1238. In various embodiments, the melt index for the thermoplastic ethylene-vinyl alcohol copolymer is preferably from about 2.5 to about 10 grams/10 min. (at 190° C., 2.16 kg), more preferably from about 1 to about 10 grams/10 min. (at 190° C., 2.16 kg) as measured using the procedure of ASTM D1238.

Thermoplastic polyurethanes can be produced via reaction of diisocyanates with difunctional compounds reactive toward isocyanates. In general, the difunctional compounds have two hydroxyl groups (diols) and may have a molar mass of from 62 (the molar mass of ethylene glycol) to about 10,000, although difunctional compounds having other isocyanate-reactive groups (e.g., secondary amines) may be used, generally in minor amounts, and a limited molar fraction of tri-functional and mono-functional isocyanate-reactive compounds may be used. Preferably, the polyurethane is linear. Including difunctional compounds with molar masses of about 400 or greater introduces soft segments into the polyurethane. An increased ratio of soft segments to hard segments in the polyurethane causes the polyurethane to become increasingly more flexible and eventually elastomeric.

The elastomeric thermoplastic polyurethanes may be thermoplastic polyester-polyurethanes or thermoplastic polyether-polyurethanes. Nonlimiting, suitable examples of these include polyurethanes polymerized using as diol reactants polyesters diols prepared from diols and dicarboxylic acids or anhydrides, polylactone polyesters diols (for example polycaprolactone diols), polyester diols prepared from hydroxy acids that are monocarboxylic acids containing one hydroxyl group, polytetrahydrofuran diols, polyether diols prepared from alkylene oxides or combinations of alkylene oxides, and combinations of these. The elastomeric thermoplastic polyurethane may be prepared by reaction of at least one of these polymeric diols (e.g., polyester diol, polyether diol, polylactone diol, or polytetrahydrofuran diol), one or more polyisocyanates, and, optionally, one or more monomeric chain extension compounds. Chain extension compounds are compounds having two or more functional groups, preferably two functional groups, reactive with isocyanate groups. Preferably the elastomeric thermoplastic polyurethane is substantially linear (i.e., all or substantially all of the reactants are di-functional).

Nonlimiting examples of polyester diols used in forming the elastomeric thermoplastic polyurethane include those prepared by the condensation polymerization of dicarboxylic compounds, their anhydrides, and their polymerizable esters (e.g. methyl esters) and diol compounds. Preferably, all of the reactants are di-functional, although small amounts of mono-functional, tri-functional, and higher functionality materials (perhaps up to a few mole percent) can be included. Suitable dicarboxylic acids include, without limitation, glutaric acid, succinic acid, malonic acid, oxalic acid, phthalic acid, hexahydrophthalic acid, adipic acid, maleic acid, anhydrides of these, and mixtures thereof. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyl tin oxides.

Hydroxy carboxylic acid compounds such as 12-hydroxystearic acid may also be polymerized to produce a polyester diol. Such a reaction may be carried out with or without an initiating diol such as one of the diols already mentioned.

Polylactone diol reactants may also be used in preparing the elastomeric thermoplastic polyurethanes. The polylactone diols may be prepared by reacting a diol initiator, e.g., a diol such as ethylene or propylene glycol or another of the diols already mentioned, with a lactone. Lactones that can be ring opened by an active hydrogen such as, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these can be polymerized. The lactone ring can be substituted with alkyl groups of 1-7 carbon atoms. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring.

In preparing a polyether diol, a diol initiator such as ethylene glycol, propylene glycol, 1,4-butanediol, or another of the diols mentioned above is reacted with an oxirane-containing compound to produce a polyether diol. The oxirane-containing compound is preferably an alkylene oxide or cyclic ether, and more preferably it is a compound selected from ethylene oxide, propylene oxide, 1-butene oxide, tetrahydrofuran, and combinations of these. Other useful cyclic ethers that may be polymerized include, without limitation, 1,2-cyclohexene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The polyether polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition.

Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

The polymeric diol, such as the polymeric polyester diols and polyether diols described above, that are used in making an elastomeric thermoplastic polyurethane synthesis preferably have a number average molecular weight (determined for example by the ASTM D-4274 method) of from about 300 to about 8,000, or from about 300 to about 5000, or from about 300 to about 3000.

The synthesis of an elastomeric thermoplastic polyurethane may be carried out by reacting one or more of the polymeric diols, one or more compounds having at least two (preferably two) isocyanate groups, and, optionally, one or more chain extension agents. The elastomeric thermoplastic polyurethanes are preferably linear and thus the polyisocyanate component preferably is di-functional or substantially di-functional. Useful diisocyanate compounds used to prepare the elastomeric thermoplastic polyurethanes, include, without limitation, methylene bis-4-cyclohexyl isocyanate, cyclohexylene diisocyanate (CHDI), isophorone diisocyanate (IPDI), m-tetramethyl xylylene diisocyanate (m-TMXDI), p-tetramethyl xylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), 2,4-tolylene ("toluene") diisocyanate and 2,6-tolylene diisocyanate (TDI), 2,4'-methylene diphenyl diisocyanate (MDI), 4,4'-methylene diphenyl diisocyanate (MDI), o-, m-, and p-xylylene diisocyanate (XDI), 4-chloro-1,3-phenylene diisocyanate, naphthylene diisocyanates including 1,2-naphthylene diisocyanate, 1,3-naphthylene diisocyanate, 1,4-naphthylene diisocyanate, 1,5-naphthylene diisocyanate, and 2,6-naphthylene diisocyanate, 4,4'-dibenzyl diisocyanate, 4,5'-diphenyldiisocyanate, 4,4'-diisocyanatodibenzyl, 3,3'-dimethoxy-4,4'-biphenylene diisocyanate, 3,3'-dimethyl-4,4'-biphenylene diisocyanate, 1,3-diisocyanatobenzene, 1,4-diisocyanatobenzene, and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400 g/mol. Alcohols and amines are preferred in some embodiments; diols are particularly preferred. Typical examples of useful diols that are used as polyurethane chain extenders include, without limitation, 1,6-hexanediol, cyclohexanedimethanol, 2-ethyl-1,6-hexanediol, 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, neopentyl glycol, dihydroxyalkylated aromatic compounds such as the bis(2-hydroxyethyl) ethers of hydroquinone and resorcinol; p-xylene-α,α'-diol; the bis(2-hydroxyethyl) ether of p-xylene-α,α'-diol; m-xylene-α,α'-diol and the bis(2-hydroxyethyl) ether, 3-hydroxy-2,2-dimethylpropyl 3-hydroxy-2,2-dimethylpropanoate; and mixtures thereof. Suitable diamine extenders include, without limitation, p-phenylenediamine, m-phenylenediamine, benzidine, 4,4'-methylenedianiline, 4,4'-methylenebis(2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to di-functional extenders, a small amount of tri-functional extenders such as trimethylolpropane, 1,2,6-hexanetriol and glycerol, or mono-functional active hydrogen compounds such as butanol or dimethyl amine, may also be present. The amount of tri-functional extenders or mono-functional compounds employed would preferably be a few equivalent percent or less based on the total weight of the reaction product and active hydrogen containing groups employed.

The reaction of the polyisocyanate(s), polymeric diol(s), and, optionally, chain extension agent(s) is typically conducted by heating the components, generally in the presence of a catalyst. Typical catalysts for this reaction include organotin catalysts such as stannous octoate or dibutyl tin dilaurate. Generally, the ratio of polymeric diol, such as polyester diol, to extender can be varied within a relatively wide range depending largely on the desired hardness of the elastomeric thermoplastic polyurethane. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 25% to about 65% by weight of the elastomeric thermoplastic polyurethane, and preferably from about 25% to about 50% by weight of the elastomeric thermoplastic polyurethane.

The polyurethanes may be used in any combination to make the low density foamed articles, including using combinations of thermoplastic polyether polyurethane elastomers and thermoplastic polyester polyurethane elastomers.

In certain embodiments it may be preferred to use an elastomer polyester polyurethane prepared from a polyester of a dicarboxylic acid having from 4 to about 8 carbon atoms, or its esterifiable derivatives such as anhydride or lower alkyl ester, and a diol having from about 4 to about 8 carbon atoms, particularly an unbranched diol. In certain embodiments, it may be preferred to use a polyester polyurethane prepared from a poly(ε-caprolactone) diol polyester or a polyether polyurethane prepared from a poly(tetrahydrofuran)polyether [also know as a poly(tetramethylene oxide)polyether or poly(tetramethylene ether)glycol]. These may be used in any combination.

In certain embodiments, preferred polyurethanes in the solid (unfoamed) form may have a Shore A hardness of from about 35 A to about 85 A, preferably from about 50 A to about 75 A, and more preferably from about 60 A to about 70 A, as measured by the method of according to ASTM D2240. In certain preferred embodiments, the polyurethane has a Shore A hardness of from about 50 A to about 80 A or from about 60 A to about 70 A and a melt flow index of from about 5 to about 100 grams/10 min. (at 190° C., 8.7 kg) or from about 180 to about 300 grams/10 min. (at 200° C., 21.6 kg)

Nonlimiting examples of suitable commercially available polyurethane elastomers include Elastollan® SP9213 (melt flow index of 200 g/10 min. (at 200° C., 21.6 kg), Elastollan®1170, Elastollan®1180, and a soft 45 A polyurethane version of these, which are available from BASF Polyurethanes GmbH; Texin® 1209, available from Bayer MaterialScience; and Estane MPD 00361B, available from the Lubrizol Corporation.

Elastomeric ethylene-vinyl acetate copolymers may be prepared by free-radical emulsion polymerization of ethylene and up to about 50% by weight vinyl acetate. The vinyl acetate monomer is usually at least about 10% by weight, preferably at least about 25% by weight of the monomers used. The ethylene-vinyl acetate copolymer has a vinyl acetate content of preferably from about 25 weight percent to about 50 weight percent and more preferably from about 35 weight percent to about 50 weight percent. The ethylene-vinyl acetate copolymers may have a melt flow index of from about 0.5 up to about 50 grams/10 min. (at 190° C., 2.16 kg) as measured using the procedure of ASTM D1238. Nonlimiting examples of suitable commercially available ethylene-vinyl acetate copolymers include Elvax 265, Elvax 40L-3 from DuPont and Lavaprene 400 from Langxess. The ethylene-vinyl acetate copolymers may be used in combination.

Pellets, beads, particles, or other pieces of the polyurethane thermoplastic elastomer or ethylene-vinyl acetate copolymer (EVA) are introduced into an extruder along with a physical or chemical blowing agent other than a supercritical fluid, with the blowing agent being used in an amount up to about 15% by weight based on polymer weight. The blowing agent may preferably be one that contains or produces nitrogen or carbon dioxide. The pellets may have a regular or irregular shape, including generally spherical, cylindrical ellipsoidal, cubic, rectangular, and other generally polyhedral shapes as well as irregular or other shapes, including those having circular, elliptical, square, rectangular, or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on.

Blowing Agent (Other than a Supercritical Fluid)

The blowing agent may be incorporated into the polymer pellets or may be dry blended with the pellets. In general, the blowing agent may be used in amounts of from about 1% by weight to about 15% by weight, based on the total weight of the polymer. In various embodiments, blowing agent or blowing agents other than supercritical fluids may be used in amounts of from about 2% by weight to about 15% by weight, or from about 3% by weight to about 12% by weight, or from about 3% by weight to about 10% by weight, based on the weight of the polymer.

Physical foaming and blowing agents function as gas sources by undergoing a phase change. Suitable physical blowing and foaming agents may be selected from the group consisting of aliphatic hydrocarbons and their chloro- and fluoro-derivatives. Typical foaming and blowing agents may be selected from isomers of pentane, hexane, heptane, fluorocarbons, trichlorofluoromethane, dichlorodifluoromethane, dichlorotetrafluoroethane, monochlorodifluoromethane, and methylene chloride. Chemical foaming and blowing agents produce a gas via a chemical reaction. Suitable chemical foaming and blowing agents may be selected from, for example, azo-type compounds for the generation of $N_2$, ammonium compounds that generate $NH_3$, and mixtures of carbonates and acids that generate $CO_2$. Specific suitable examples include sodium bicarbonate, dinitrosopentamethylene-tetramine, sulfonyl hydroxides, azodicarbonamide, p-toluenesulfonyl semicarbazide, 5-phenyltetrazole, diisopropylhydrazodicarboxylate and sodium borohydrite. The thermal decomposition of the foaming or blowing agents can be lowered through addition of activators or accelerators, as is known in the art.

In another embodiment, microbeads containing physical blowing agent are used as a blowing agent. The microbeads are usually made of a shell of thermoplastic polymer with, in the core, a liquid, low-boiling gas based on alkanes. The preparation of these microbeads is described by way of example in U.S. Pat. Nos. 3,615,972, 6,509,384, 7,956,096, and 8,388,809, the disclosures of which are incorporated herein by reference. The microbeads typically have a diameter of from 5 to 50 µm. Examples of suitable microbeads are obtainable with Expancell® from Akzo Nobel.

The chemical or physical blowing agents may be used in any combination. The blowing agent or combination of blowing agents other than supercritical fluids may be incorporated into the polymer pellets (as in the common procedure of forming a masterbatch), may be dry blended with the polymer pellets before being added to the extruder, or may be added to the extruder separately from the pellets.

Other materials that may be used in thermoplastic elastomeric polyurethane or ethylene-vinyl acetate copolymer compositions that are foamed include, without limitation, colorants, particularly pigments; fillers, including clays, nanoclays, nanotubes, halloysite clay, which is available from Applied Minerals under the trademark Dragonite™, and so on; surfactants, release agents, antioxidants, stabilizers, crosslinkers that may be included in amounts that lightly crosslink the elastomer but leave the elastomer foam a thermoplastic, and so on.

Equipment and Process

In describing the equipment and process, "clamping force" refers to the force that holds together the two mold halves that define the mold cavity. The clamping force can be determined, for example, by multiplying the hydraulic pressure by the piston surface area in a clamping device (for hydraulic clamping devices), by measuring the force using a load cell associated with the mold halves and/or platens, or by measuring tie bar elongation or strain and converting to a clamping force. The term "injection pressure" refers to the pressure at which polymeric material is injected into the mold. The injection pressure can be determined, for example, by measuring the hydraulic load (for hydraulic injection systems) or by measuring the servomotor torque and multiplying it by the appropriate mechanical advantage factor of the system (for electrical injection systems). The term "supercritical fluid additive" refers to a supercritical fluid under temperature and pressure conditions within an extruder (e.g., 12, FIG. 1). The supercritical fluid additive may or may not be a supercritical fluid prior to introduction into the extruder (e.g., when supercritical fluid additive is in source 22, FIG. 1) and the supercritical fluid additive may be introduced into the polymeric material in the extruder in any flowable state, for example, as a gas, a liquid, or a supercritical fluid.

Figure 1B:
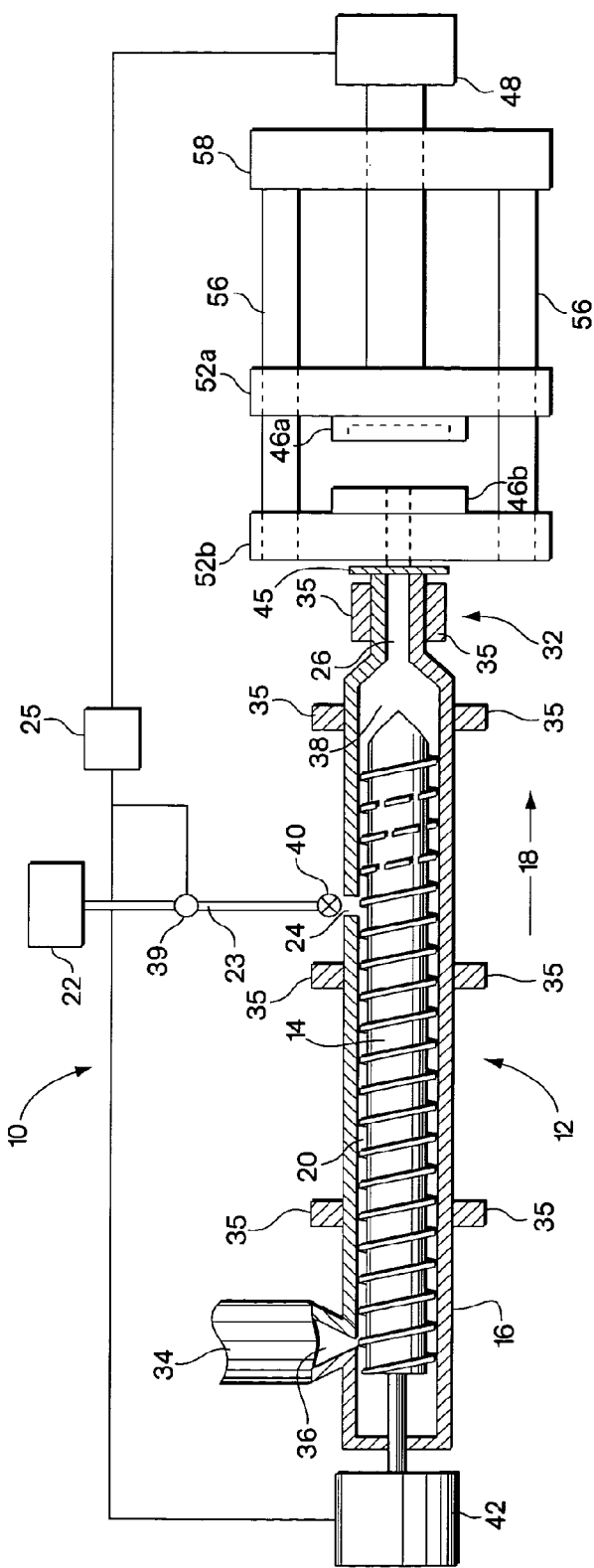

With reference now to the drawings, FIGS. 1A and 1B schematically illustrate an injection molding system 10 that may be used in one embodiment of the disclosed process. An extruder 12 of molding system 10 includes a polymer processing screw 14 that is rotatable within a barrel 16 to convey the polymeric material in a downstream direction 18 within a polymer processing space 20 defined between the screw and the barrel. A source 22 of supercritical fluid additive that is connected via conduit 23 to a port 24 formed within the barrel. Extruder 12 includes an outlet 26 connected to an injection mold 28. Optionally, system 10 includes a control system 25 that is capable of controlling the injection molding process and supercritical fluid additive introduction into the polymeric material.

Generally, injection molding system 10 operates cyclically to produce multiple molded articles. At the beginning of a typical molding cycle, screw 14 is positioned at a downstream end 32 of barrel 16. The thermoplastic polyurethane elastomer or EVA, typically in pelletized form, and the blowing agent other than supercritical fluid are fed into polymer processing space 20 from a hopper 34 through an orifice 36. Barrel 16 is heated by one or more heating units 35 and screw 14 rotates to knead and mix the melting polyurethane elastomer or EVA and blowing agent and to convey the mixture in downstream direction 18. The polyurethane elastomer or EVA and blowing agent mixture should be in a fluid state at the point of supercritical fluid additive introduction through port 24. The flow rate of supercritical fluid additive into the polymer mixture may be metered, for example, by a metering device 39 positioned between source 22 and port 24. The metering device 39 may also be connected to control system 25, which sends signals to control supercritical fluid additive flow rate. The molten polymer and supercritical fluid additive are mixed and conveyed downstream by the rotating screw and accumulated in a region 38 within the barrel downstream of the screw. The accumulation of the mixture in region 38 creates a pressure that forces the screw axially in an upstream direction in the barrel. After a sufficient charge of the mixture has been accumulated, screw 14 ceases to rotate and stops moving in the upstream direction. Preferably, when the screw stops the introduction of supercritical fluid additive into the polymeric material is, or has been, stopped, for example, by the operation of an injector valve 40 associated with port 24.

Then, the screw is moved axially in a downstream direction by an injection device 42 to downstream end 32 of the barrel, returning to the original screw position to inject the accumulated charge of the mixture through outlet 26 of the extruder and into a cavity 44 (FIG. 2A) defined between mold halves 46a, 46b. A shut-off nozzle valve 45 associated with the outlet of the extruder typically is opened to permit the mixture to flow into the cavity. After the charge is injected into the cavity, valve 45 is typically closed. As described further below and shown in FIGS. 2A and 2B, a clamping device 48 holds mold halves 46a, 46b of the mold 28 (FIG. 2A) together during injection and the subsequent cooling of the polymeric material. After the polymeric material sufficiently solidifies, clamping device 48 separates mold halves 46a, 46b (FIG. 1B) to eject a molded article. The molding cycle is repeated to produce additional molded articles.

The extruder screw extrudes (FIG. 3) or injects (FIGS. 1A, 1B) the mixture at a preferred rate of from about 1 to about 5 inches per second (2.54 to about 12.7 cm/s). The mold may be heated, for example up to about 50° C. The injection pressure may be from about 9000 psi (62 MPa) to about 30,000 psi (207 MPa), preferably from about 18,000 psi (124.1 MPa) or from about 22,000 psi (152 MPa) to about 28,000 psi (193 MPa) or to about 30,000 psi (207 MPa), particularly preferably from about 18,000 psi (124.1 MPa) to about 28,000 psi (193 MPa).

Molding system 10 may include a number of variations from the illustrative embodiment as known to one of ordinary skill in the art. For example, a mold may define more than one cavity in which articles may be molded and may include a hot runner gate to introduce polymeric material into the cavities. The hot runner gate may also be provided with a valve to selectively control introduction of the polyurethane or EVA material. It should also be understood that the injection molding system may be a hydraulic system, an electrical system, or a hybrid hydraulic/electric system.

Control system 25 can coordinate the operation of metering device 39 with screw 14 so that a desired amount of supercritical fluid additive is introduced into the polymeric material to form a mixture having the desired weight percentage of supercritical fluid additive. In some embodiments, a first controller controls the operation of the injection molding system and a second controller controls supercritical fluid additive introduction. In other embodiments, a single controller controls operation of the injection molding system and supercritical fluid additive introduction.

Figure 2A:
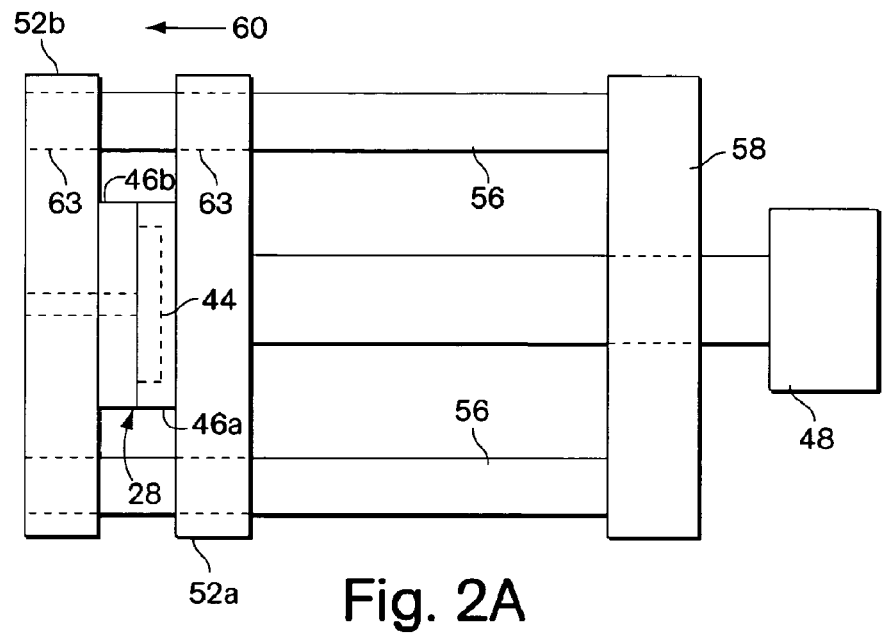
FIGS. 2A and 2B are exploded views of the injection mold and the clamping device of the injection molding system of FIGS. 1A and 1B.
Figure 2B:
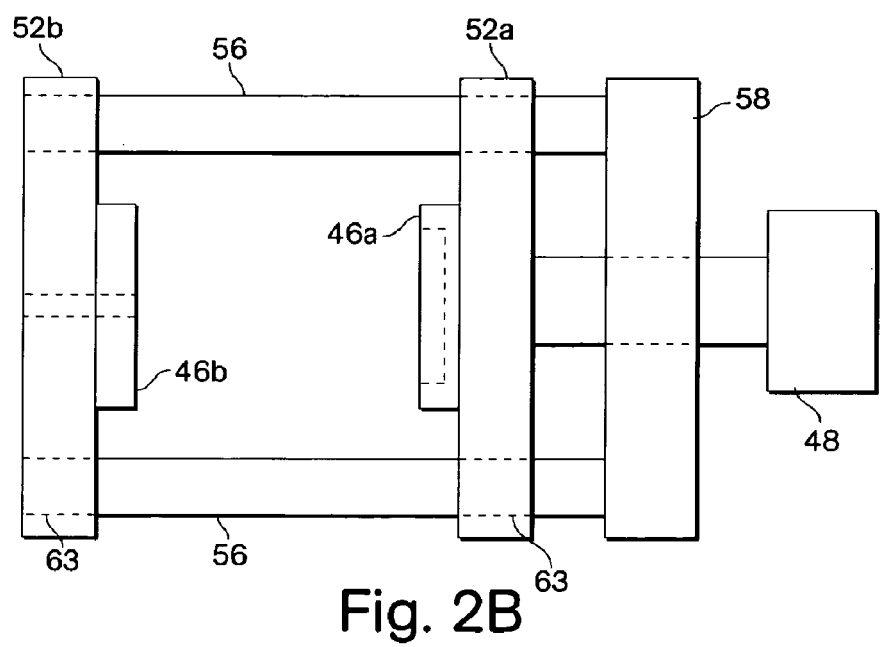

Referring to FIGS. 2A and 2B, injection mold 28 and clamping device 48 are shown. In the illustrative embodiment, mold half 46a is secured to a movable platen 52a, and mold half 46b is secured to a fixed platen 52b. Platen 52a is slideably mounted on a plurality of tie bars 56 which extend from a backside 58 of system 10 to fixed platen 52b. Platen 52a reciprocates on tie bars 56 to open and close mold 28 in response to the action of clamping device 48 which is synchronized with the molding cycle. Mold 28 is closed when clamping device 48 pushes platen 52a in the direction of arrow 60, which forces mold half 46a against mold half 46b (FIG. 2A). Clamping device 48 holds mold halves 46a, 46b together with a clamping force during injection and while the molded part cools. To open the mold, clamping device retracts platen 52a in a direction opposite arrow 60 which separates mold halves 46a, 46b (FIG. 2B).

Other configurations of the injection mold and clamping device may also be used in the disclosed process. For example, in some cases, the mold may not include platens, but rather the movable mold half may be secured directly to the clamping device and the other mold half secured to the frame of the system. In other embodiments, a pressure measuring device may be associated with mold cavity 44 to monitor pressure within the mold (i.e., cavitation pressure). The pressure measuring device may, for example, access the mold cavity through a wall of one of the mold halves. The pressure measuring device can send output signals representative of the cavitation pressure, for example, to control system 25 to control various molding parameters such as injection speed and injection force.

Clamping device 48 may be any suitable type. Clamping device 48 may be hydraulically or mechanically/electrically powered. A clamping device can be characterized by the maximum force it is capable of providing. Suitable clamping devices may provide a maximum force, for example, of between about 10 tons-force (98 kN) and about 10,000 tons-force (98,000 kN), and more typically between about 50 tons-force (490 kN) and about 3,000 tons-force (about 29,420 kN). The specific clamping force depends on various factors, such as the article being molded.

Clamping device 48 generally needs to provide a clamping force sufficient to prevent polymeric material injected into cavity 44 from flashing between mold halves 46a, 46b.

As shown in FIGS. 5 and 6, mold back surface 59 at arrows 1 includes a porous tool 220 in mold cavity 44 adjacent mold wall 210. The porous tool may be located anywhere adjacent an inner mold surface, such as along the back surface 59 as shown, a side surface 61, or a surface of the fixed mold half 46b, adjacent to more than one area of the inner mold surface, or adjacent to all inner surfaces. The porous tool may be an insert that is generally the dimensions of the mold cavity, or may be one or a plurality of smaller inserts—for example, three to five inserts-spaced within the mold cavity. The porous tool, or all of the porous tools collectively placed in the mold, may have a pore size of from about 3 μm to about 20 μm, preferably from about 7 μm to about 12 μm, for absorbing gas generated during foaming of the molded article. The porous tool may be a porous metal or metal alloy, such as a porous aluminum or a porous steel, a porous ceramic, such as a porous cordierite, zirconium oxide, silicon carbide, aluminum oxide, or silicon nitride ceramic, or another porous material that does not melt or soften at the temperatures reached during the molding process. Open cell metal and ceramic foams or sintered porous metal materials, which can be made from metal powders, can be fabricated as a porous tool in a desired shape to fit in one or more areas inside the mold cavity and absorb gas during foaming of the polymer.

The porous tool may also have any desired shape and be placed at a desired location or locations within the mold cavity. For example, the porous tool may have a feature extending into the mold cavity.

In another embodiment shown in FIG. 3, the mixture of polyurethane or EVA, blowing agent, and supercritical fluid additive may be extruded as a foam instead of injection molded. An extrusion system 130 includes a screw 138 that rotates within a barrel 132 to convey, in a downstream direction 33, polymeric material in a processing space 135 between the screw and the barrel. The polymeric material is extruded through a die 137 fluidly connected to processing space 135 and fixed to a downstream end 136 of barrel 132. Die 137 is configured to form an extrudate 139 of microcellular foam in the desired shape. The thermoplastic polyurethane elastomer or EVA, for example in the form of pellets containing the blowing agent or as a dry mixture of polyurethane elastomer or EVA pellets and the blowing agent, is gravity fed into polymer processing space 135 through orifice 146 from a standard hopper 144. Extrusion screw 138 is operably connected, at its upstream end, to a drive motor 140 which rotates the screw. Positioned along extrusion barrel 132 are temperature control units 142, which for example can be electrical heaters or can include passageways for temperature control fluid, that can be used to heat the polyurethane or EVA within the extrusion barrel to facilitate melting, to cool the stream to control viscosity, skin formation, or dissolution of the supercritical fluid. The temperature control units can operate differently at different locations along the barrel, that is, to heat at one or more locations, and to cool at one or more different locations. Any number of temperature control units can be provided. Temperature control units 142 can also optionally be used to heat die 137.

The supercritical fluid additive is introduced into the polymer stream through a port 154 in fluid communication with a source 156 of the supercritical fluid additive. Device 158 can be used to meter the supercritical fluid additive.

Supercritical Fluid

The supercritical fluid additive may have a variety of compositions including nitrogen, carbon dioxide, and mixtures thereof. According to one preferred embodiment, the supercritical fluid additive is carbon dioxide. In another preferred embodiment the supercritical fluid additive is nitrogen. In certain embodiments, the supercritical fluid additive is solely carbon dioxide or nitrogen.

Supercritical $CO_2$ may be combined with the polymer in an amount of from about 0.1 weight percent to about 5 weight percent, preferably from about 0.5 weight percent to about 5 weight percent, more preferably from about 0.5 to about 3 weight percent, and still more preferably from about 1 weight percent to about 3 weight percent based on polymer weight. Supercritical $N_2$ may be combined with the polymer in an amount of from about 0.1 weight percent to about 4 weight percent, preferably from about 0.4 weight percent to about 2.5 weight percent, and more preferably from about 0.7 weight percent to about 1.5 weight percent based on polymer weight. When forming microcellular materials, it may be preferable to form a single-phase solution of polymeric material and supercritical fluid additive before extruding or injection molding the polymer mixture. To aid in the formation of a single-phase solution, supercritical fluid introduction may be done through a plurality of ports 24 arranged in the barrel, though it should be understood that a single port may also be utilized to form a single-phase solution. When multiple ports 24 are utilized, the ports can be arranged radially about the barrel or in a linear fashion along the length of the barrel. An arrangement of ports along the length of the barrel can facilitate injection of supercritical fluid additive at a relatively constant location relative to the screw when the screw moves axially (in an upstream direction) within the barrel as the mixture of polymeric material and supercritical fluid additive is accumulated. Where radially-arranged ports are used, ports 24 may be placed in equally-spaced positions about the extruder barrel, or in any other configuration as desired. Port 24 (FIGS. 1A, 1B) may include a single orifice or a plurality of orifices. In the multi-orifice embodiments the port may include at least about 2, and some cases at least about 4, and others at least about 10, and others at least about 40, and others at least about 100, and others at least about 300, and others at least about 500, and in still others at least about 700 orifices. In another embodiment, port 24 includes an orifice containing a porous material that permits supercritical fluid additive to flow through and into the barrel, without the need to machine a plurality of individual orifices.

To further promote the formation of a single-phase solution, port 24 may be located at a section of the screw that may include full, unbroken flight paths. In this manner, each flight, passes or "wipes" the port including orifices periodically, when the screw is rotating. This wiping increases rapid mixing of supercritical fluid additive and polymeric material in the extruder and the result is a distribution of relatively finely divided, isolated regions of supercritical fluid additive in the polymeric material immediately upon injection into the barrel and prior to any mixing. Downstream of port 24, the screw may include a mixing section which has highly broken flights to further mix the polymeric material and supercritical fluid additive mixture to promote formation of a single-phase solution.

FIG. 4 illustrates an embodiment of the extruder 130 of FIG. 3 in which the supercritical fluid additive port is illustrated in greater detail and, in addition, two ports on opposing top and bottom sides of the barrel are shown. In this embodiment, port 154 is located in the injection section of the screw at a region upstream from mixing section 160 of screw 138 (including highly-broken flights) at a distance upstream of the mixing section of no more than about 4 full flights, preferably no more than about 2 full flights, or no more than 1 full flight. Positioned in this way, injected supercritical fluid additive is very rapidly and evenly mixed into the polymer melt to produce a single-phase solution of the supercritical fluid in the polymer melt.

Port 154, in the preferred embodiment illustrated, is a multi-hole port including a plurality of orifices 164 connecting the blowing agent source with the extruder barrel. As shown, in preferred embodiments a plurality of ports 154 are provided about the extruder barrel at various positions radially and can be in alignment longitudinally with each other. For example, a plurality of ports 154 can be placed in spaced positions about the extruder barrel, each including multiple orifices 164. In this manner, where each orifice 164 is considered a supercritical fluid additive orifice, there may be at least about 10, preferably at least about 40, more preferably at least about 100, more preferably at least about 300, more preferably at least about 500, and more preferably still at least about 700 supercritical fluid additive orifices in fluid communication with the extruder barrel.

Also in preferred embodiments is an arrangement (as shown in FIG. 4) in which the blowing agent orifice or orifices are positioned along the extruder barrel at a location where, when a preferred screw is mounted in the barrel, the orifice or orifices are adjacent full, unbroken flights 165. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing.

Referring again to FIG. 3, a mixing section of screw 138, following the gas injection section, is constructed to mix the blowing agent and polymer stream to promote formation of a single phase solution of supercritical fluid additive and polymer. The mixing section includes unbroken flights which break up the stream to encourage mixing. Downstream the mixing section, a metering section builds pressure in the polymer-supercritical fluid additive stream prior to die 137. Die 137 can have any variety of configurations, as is well known in the art, to produce microcellular foam in specific forms, for example sheets or profiles. In addition to shaping extrudate 139, die 137 may also perform the function of nucleating the polymer and supercritical fluid additive single-phase solution. The pressure in the single phase solution drops as the solution flows through the internal passageways of the die. This pressure drop causes the solubility of the supercritical fluid additive in the polymer to decrease, which is the driving force for the cell nucleation process. The extent of pressure drop depends upon the dimensions of the passageway. Specifically the dimensions that effect pressure drop include the shape of the passageway, the length of the passageway, and the thickness of the passageway. Typically, the geometry of the die is designed to give a pressure drop suitable for cell nucleation to produce a microcellular foam. Other equipment (not illustrated) downstream of the die is used, as required, for additional shaping of the extrudate into a final form.

The foamed thermoplastic elastomeric polyurethane article may have a density of less than about 0.3 g/cm$^3$, preferably less than about 0.25 g/cm$^3$, more preferably less than about 0.2 g/cm$^3$. In various embodiments, the foamed thermoplastic elastomeric polyurethane article may have a density of from about 0.15 to about 0.3 g/cm$^3$, or a density of from about 0.15 to about 0.25 g/cm$^3$, or a density of from about 0.15 to about 0.2 g/cm$^3$.

The foamed thermoplastic elastomeric EVA article may have a density of less than about 0.3 g/cm$^3$, preferably less than about 0.25 g/cm$^3$, more preferably less than about 0.2 g/cm$^3$. In various embodiments, the foamed thermoplastic elastomeric polyurethane article may have a density of from about 0.15 to about 0.3 g/cm$^3$, or a density of from about 0.15 to about 0.25 g/cm$^3$, or a density of from about 0.15 to about 0.2 g/cm$^3$.

The shaped article may be of any dimensions. For example, the molded article may be sized as a cushion or cushioning element that can be included in an article of footwear, for example part of a footwear upper, such as a foam element in a collar or tongue, as an insole, as a midsole or a part of a midsole, or as an outsole or a part of an outsole; foam padding in shinguards, shoulder pads, chest protectors, masks, helmets or other headgear, knee protectors, and other protective equipment; an element placed in an article of clothing between textile layers; in clothing, or may be used for other known padding applications for protection or comfort, especially those for which weight of the padding or cushioning is a concern. The molded article may be incorporated as cushioning into other articles.

In various embodiments, the molded article is a midsole for an article of footwear. A midsole provides cushioning in the footwear. A midsole should be durable but also preferably adds as little weight as possible to the footwear while still cushioning to the desired degree. A midsole also should be able to be bonded to an outsole, an upper, or any other components (e.g., a shank, an airbag, or decorative components) in making an article of footwear.

In other embodiments, the molded article is an outsole for an article of footwear.

The invention is further described in the following examples. The examples are merely illustrative of various embodiments. All parts are parts by weight unless otherwise noted.

EXAMPLES

Injection molded foam parts were prepared by introducing into an extruder pellets of polyurethane elastomers that were dry mixed with a blowing agent (Konz V2894, obtained from BASF), as shown in the table. The blend of blowing agent and polymer are dried and then fed to the injection machine. The mixture of blowing agent and polymer are then melted within the barrel by heat and shear. In the example of the invention, supercritical fluid carbon dioxide is added into the injection machine barrel and dispersed within the melted polymer and blowing agent. The mixture of the supercritical fluid carbon dioxide, melted polymer and blowing agent is then injected into the mold. In the comparative example, the mixture of melted polymer and blowing agent is injected into the mold. Density of the molded, foamed part is recorded.

|  | Blowing Agent, wt % (on polymer weight) | Polyurethanes, weight ratio | Supercritical fluid $CO_2$, wt % (on polymer weight) | Density (g/cm$^3$) |
|---|---|---|---|---|
| Example of the Invention | Konz V2894[1], 5 wt % | LJ5913[2]/SOFT 45A[3], 60/40 | 4 | 0.28 |
| Comparative Example | Konz V2894, 5 wt % | LJ5913/SOFT 45A, 60/40 | 0 | 0.44 |

[1]Obtained from BASF
[2]LJ5913 has a having a Shore A hardness of 70A and is a polyether-based TPU, has a melt index in the range of 180-300/10 min. @ 200° C./21.6 kg, obtained from BASF.
[3]Soft 45A is polyester-based and plasticized TPU having a Shore A hardness of 45A and a melt index in the range of 20-3910/10 min. at 190° C./8.7 kg, obtained from BASF.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for making a low density foamed article, comprising:
combining in an extruder a molten thermoplastic polyurethane elastomer with (a) a chemical blowing agent and
(b) a supercritical fluid,
to form a mixture, wherein the chemical blowing agent (a) is present in an amount up to about 15 wt % based on total polymer weight in the mixture and the supercritical fluid (b) comprises one of about 0.1 to about 5 weight percent of supercritical $CO_2$ based on the total polymer weight in the mixture or about 0.1 to about 4 weight percent of supercritical $N_2$ based on the total polymer weight in the mixture, and
injecting the mixture into a mold at an injection pressure of from 110 MPa to about 207 MPa, and molding the mixture to form the low density foamed article, wherein the mold comprises a porous tool;
wherein the low density foamed article has a density of less than 0.3 $g/cm^3$.

2. A method according to claim 1, wherein the molten thermoplastic polyurethane elastomer comprises a thermoplastic polyurethane elastomer having a solid Shore A hardness of from about 35 A to about 85 A.

3. A method according to claim 2, wherein the solid Shore A hardness is from about 50 A to about 80 A.

4. A method according to claim 1, wherein the chemical blowing agent is present in an amount from about 3 to about 12 wt % based on the total polymer weight in the mixture.

5. A method according to claim 1, wherein the supercritical fluid is one of from about 0.5 to about 3 weight percent of supercritical $CO_2$ based on the total polymer weight in the mixture or from about 0.4 to about 2.5 weight percent of supercritical $N_2$ based on the total polymer weight in the mixture.

6. A method according to claim 1, wherein the mixture further comprises a crosslinker.

7. A method according to claim 1, wherein the porous tool has a pore size of from about 3 micrometers to about 20 micrometers.

8. A method according to claim 1, wherein the porous tool is a porous metal or metal alloy.

9. A method according to claim 1, wherein the porous tool is an insert having dimensions of the mold cavity.

10. A method according to claim 1, wherein the porous tool comprises a plurality of inserts spaced within the mold cavity.

11. A method for making a low density foamed article, comprising:
combining in an extruder a molten thermoplastic polyurethane elastomer having a solid Shore A hardness of from about 35 A to about 85 A and a melt index of from about 5 to about 100 grams/10 min. as measured according to ASTM D1238 using an 8.7 kg weight and a temperature of 190° C. or from about 180 to about 300 grams/10 min. as measured according to ASTM D1238 using a 21.6 kg weight and a temperature of 200° C. with
(a) a chemical blowing agent and
(b) a supercritical fluid
to form a mixture, wherein the chemical blowing agent (a) is present in an amount up to 15 wt % based on total polymer weight in the mixture and the supercritical fluid (b) comprises one of about 0.1 to about 5 weight percent of supercritical $CO_2$ based on the total polymer weight in the mixture or about 0.1 to about 4 weight percent of supercritical $N_2$ based on the total polymer weight in the mixture, and
injecting the mixture into a mold at an injection pressure of from 110 MPa to about 207 MPa, and molding the mixture to form the low density foamed article.

12. A method according to claim 11, wherein the Shore A hardness is from about 50 A to about 80 A.

13. A method according to claim 11, wherein the or chemical blowing agent is present in an amount from about 3 to about 12 wt % based on the total polymer weight in the mixture.

14. A method according to claim 11, wherein the supercritical fluid is one of from about 0.5 to about 3 weight percent of supercritical $CO_2$ based on the total polymer weight in the mixture or from about 0.4 to about 2.5 weight percent of supercritical $N_2$ based on the total polymer weight in the mixture.

15. A method for making a low density foamed article, comprising:
combining in an extruder a molten polymer thermoplastic polyurethane elastomer having a melt index of from about 5 to about 100 grams/10 min. as measured according to ASTM D1238 using an 8.7 kg weight and a temperature of 190° C., or from about 180 to about 300 grams/10 min. as measured according to ASTM D1238 using a 21.6 kg weight and a temperature of 200° C. with
(a) a chemical blowing agent and
(b) a supercritical fluid
to form a mixture, wherein the chemical blowing agent is present in an amount up to 15 wt % based on total polymer weight in the mixture and the supercritical fluid comprises one of about 0.1 to about 5 weight percent of supercritical $CO_2$ based on the total polymer weight in the mixture or about 0.1 to about 4 weight percent of supercritical $N_2$ based on the total polymer weight in the mixture, and
injecting the mixture into a mold at an injection pressure of from 110 MPa to about 207 MPa, and molding the mixture to form the low density foamed article; wherein the mold comprises a porous tool;
wherein the low density foamed article has a density of less than 0.3 $g/cm^3$.

16. A method according to claim 15, wherein the molten polymer comprises a thermoplastic polyurethane elastomer having a solid Shore A hardness of from about 35 A to about 85 A.

17. A method according to claim 15, wherein the chemical blowing agent is present in an amount from about 3 to about 12 wt % based on the total polymer weight.

18. A method according to claim 15, wherein the supercritical fluid is one of from about 1 to about 3 weight percent of supercritical $CO_2$ based on the total polymer weight in the mixture or from about 0.4 to about 2.5 weight percent of supercritical $N_2$ based on the total polymer weight in the mixture.

19. A method according to claim 15, wherein the porous tool has a pore size of from about 3 micrometers to about 20 micrometers.

20. A method according to claim 15, wherein the porous tool is a porous metal or metal alloy.

21. A method according to claim 15, wherein the porous tool is an insert that is generally the dimensions of the mold cavity.

22. A low density foamed article made by the method of claim 1.

23. The low density foamed article according to claim 22, wherein the article has a density of from about 0.15 to less than 0.3 $g/cm^3$.

24. The low density foamed article according to claim 22, wherein the article is a cushion or cushioning element for an article of footwear, protective equipment, or clothing.

\* \* \* \* \*

UNITED STATES PATENT AND TRADEMARK OFFICE
CERTIFICATE OF CORRECTION

| | | |
|---|---|---|
| PATENT NO. | : 9,926,423 B2 | Page 1 of 1 |
| APPLICATION NO. | : 13/958517 | |
| DATED | : March 27, 2018 | |
| INVENTOR(S) | : Hossein A. Baghdadi | |

It is certified that error appears in the above-identified patent and that said Letters Patent is hereby corrected as shown below:

In the Claims

At Column 16, Line 3, in Claim 13, delete:
"A method according to claim 11, wherein the or,"
And replace with:
--A method according to claim 11, wherein the--

Signed and Sealed this
Twenty-sixth Day of June, 2018

Andrei Iancu
*Director of the United States Patent and Trademark Office*